United States Patent [19]

Yamamoto et al.

[11] Patent Number: 5,528,940
[45] Date of Patent: Jun. 25, 1996

[54] PROCESS CONDITION DETECTING APPARATUS AND SEMICONDUCTOR SENSOR CONDITION DETECTING CIRCUIT

[75] Inventors: Yoshimi Yamamoto, Naka-machi; Tomoyuki Tobita, Katsuta, both of Japan

[73] Assignee: Hitachi, Ltd., Tokyo, Japan

[21] Appl. No.: 190,847

[22] Filed: Feb. 3, 1994

[30] Foreign Application Priority Data

Feb. 10, 1993 [JP] Japan .................................. 5-022358

[51] Int. Cl.⁶ .......................... G01L 19/04; H01C 10/10
[52] U.S. Cl. .................... 73/708; 73/720; 73/726; 338/42; 374/198
[58] Field of Search ............................ 73/708, 719, 720, 73/721, 725, 726, 727, 754; 338/36, 42; 374/198

[56] References Cited

U.S. PATENT DOCUMENTS

| | | |
|---|---|---|
| 4,468,968 | 9/1984 | Kee ........................................... 73/708 |
| 4,598,381 | 7/1986 | Cucci ..................................... 73/708 X |
| 4,872,349 | 10/1989 | Espiritu-Santo ....................... 73/708 X |

*Primary Examiner*—Richard Chilcot
*Assistant Examiner*—Joseph L. Felber
*Attorney, Agent, or Firm*—Antonelli, Terry, Stout & Kraus

[57] ABSTRACT

A differential pressure transmitter having a differential pressure sensor, a temperature sensor and a static pressure sensor all provided on the semiconductor substrate of a single semiconductor chip. A reference resistor is provided in a part of the chip. Resistances of the differential pressure sensor and the reference resistor are compared periodically in order to determine the condition including service life of the differential pressure sensor.

21 Claims, 10 Drawing Sheets

| | TYPE OF SW | ON | OFF |
|---|---|---|---|
| SWITCH MODE 1 VΔP out | SWH | ○ | |
| | SWL | ○ | |
| | SWB | | ○ |
| SWITCH MODE 2 V2 out | SWH | ○ | |
| | SWL | | ○ |
| | SWB | ○ | |
| SWITCH MODE 3 V1 out | SWH | | ○ |
| | SWL | ○ | |
| | SWB | ○ | |

V1+V2

DIFFERENTIAL PRESSURE ΔP, STATIC PRESSURE P, CHANGE OF TEMPERATURE T

| SYSTEM INSPECTION TIME: T₂ | | | |
|---|---|---|---|
| SENSOR NO. | $V_1+V_2$ | $V_1-V_2$ | CONDITION |
| 10 | 0.00 | 4.26 | ○ |
| 11 | 0.12 | 2.13 | × |
| 12 | 0.00 | 4.26 | ○ |

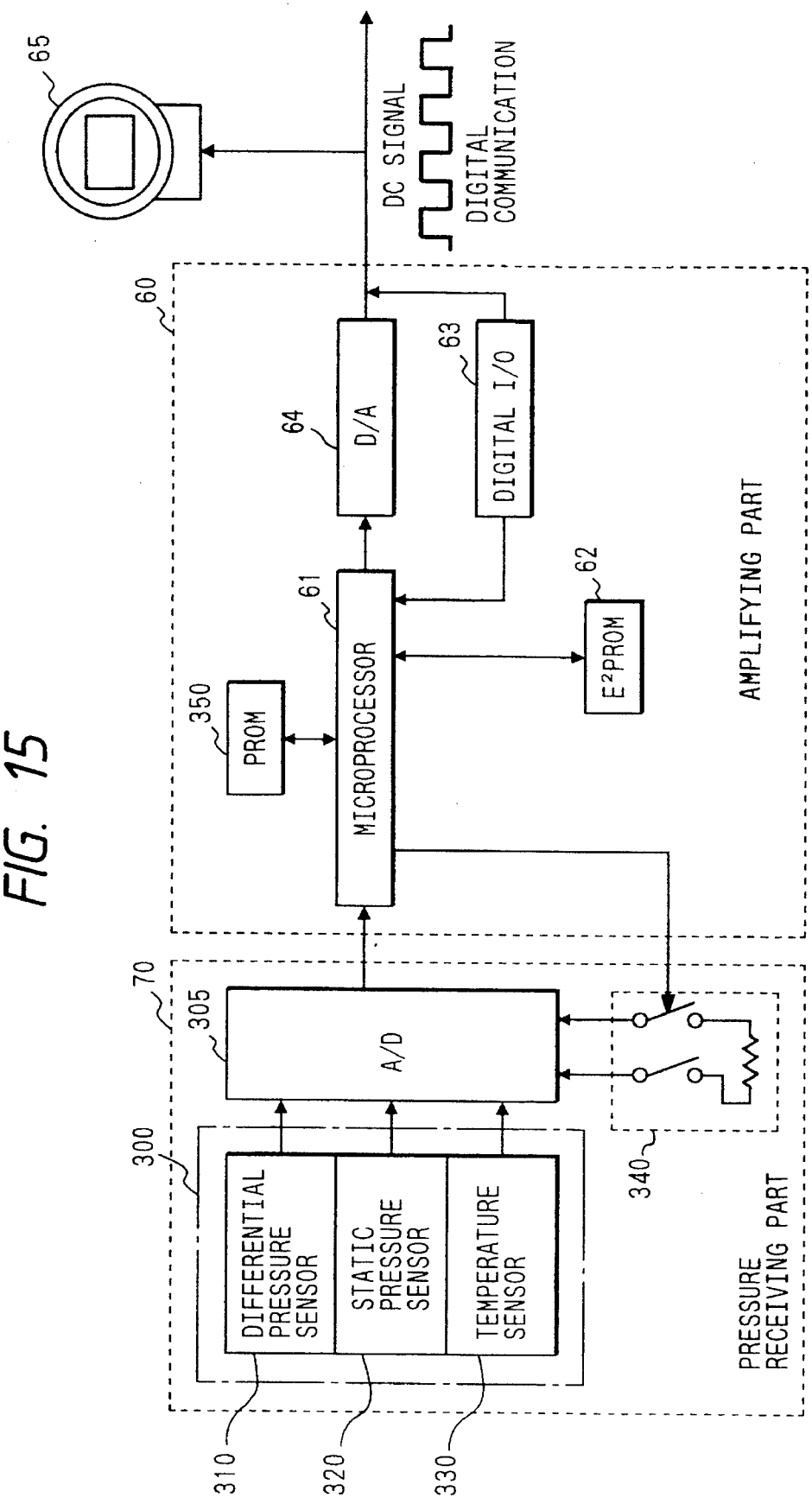

PROCESS CONDITION DETECTING APPARATUS AND SEMICONDUCTOR SENSOR CONDITION DETECTING CIRCUIT

BACKGROUND OF THE INVENTION

The present invention relates to a process condition detector for detecting a condition of a process, particularly to a process condition detector for detecting a change in aging and accuracy of a sensor which measures a condition of a process and predicts the service life of the sensor.

A conventional process condition detector apparatus is provided with a main sensor (e.g., differential pressure sensor) for measuring a specific condition of a process and a compensation sensor (e.g., static pressure sensor or temperature sensor) for measuring other conditions of the process on a semiconductor sensor substrate in order to precisely detect the process condition. The relationship between the output characteristic of the main sensor and that of the compensation sensor is preliminarily found before detecting actual plant data. Thus, the process condition of a process is precisely detected by correcting the output of the main sensor with that of the compensation sensor when the actual process data is measured.

When measuring a condition of an actual process, the conventional detecting apparatus is normally disposed in the field where the process is performed. Disposing the conventional detecting apparatus in the field subjects a semiconductor sensor of the apparatus to greatly varying conditions in the field caused by the process. Thus, the characteristics of the main sensor and the compensation sensor for detecting the process condition change as time passes. Particularly the conventional detecting apparatus becomes less accurate as time passes.

The conventional detecting apparatus does not have any means for detecting the change in the characteristics of the main and compensating sensors with the passage of time. Thus, the output of the conventional detecting apparatus for the same process condition changes with the passage of time. Therefore, a critical problem may occur in process operation because the process condition detected by the conventional detecting apparatus becomes more and more different from the actual process condition as time passes.

SUMMARY OF THE INVENTION

The present invention solves the above noted problems of the conventional detecting apparatus. Thus, an object of the present invention is to provide a process condition detecting apparatus for detecting a change in the characteristics of a semiconductor sensor with the passage of time that effect the detection of a process condition.

Another object of the present invention is to provide a semiconductor sensor condition detecting circuit for accurately detecting a change in the characteristics of a semiconductor sensor with the passage of time.

To achieve the above objects, the process condition detecting apparatus of the present invention includes a semiconductor sensor provided with first and second resistors which are used to sense a condition of a process. A change in the characteristics of the semiconductor sensor with the passage of time is detected by determining the resistances of the first and second resistors and comparing them.

Particularly, the present invention is directed to a process condition detecting apparatus provided with a semiconductor sensor having first and second resistors which are provided with a pair of resistor elements respectively and whose resistances change according to a change in a condition of a process. The semiconductor sensor senses the condition of the process by detecting the change in the resistances of the first and second resistors. The process condition detecting apparatus includes a comparator apparatus for comparing the resistances of the first and second resistors and outputting a comparison value and a sensor condition detecting apparatus for detecting a change in accuracy of the sensing performed by the semiconductor sensor based on the comparison value output by the comparator apparatus.

A semiconductor sensor condition detecting circuit of the present invention is also provided for detecting a change in a characteristic of a semiconductor sensor with the passage of time and include a reference resistor which is provided with a pair of resistor elements to be connected to first or second resistors. The first and second resistors are used to sense a process condition and are provided on the semiconductor sensor.

In the semiconductor sensor condition detecting circuit of the present invention the resistances of the first and second resistors change according to a change in a condition of the process. The semiconductor sensor senses the condition of the process by detecting the change in resistances of the first and second resistors. The semiconductor sensor condition detecting apparatus includes the reference resistors apparatus for periodically comparing the resistance of the reference resistor to the resistance of the first or second resistor and outputting comparison values and apparatus for detecting a change in condition of the semiconductor sensor based on the comparison values.

Other and further objects and features of the invention will appear fully from the following description.

BRIEF DESCRIPTION OF THE DRAWINGS

FIG. 15 shows an example of an arrangement of reference resistor of the present invention.

DESCRIPTION OF THE PREFERRED EMBODIMENT

Figure 1:
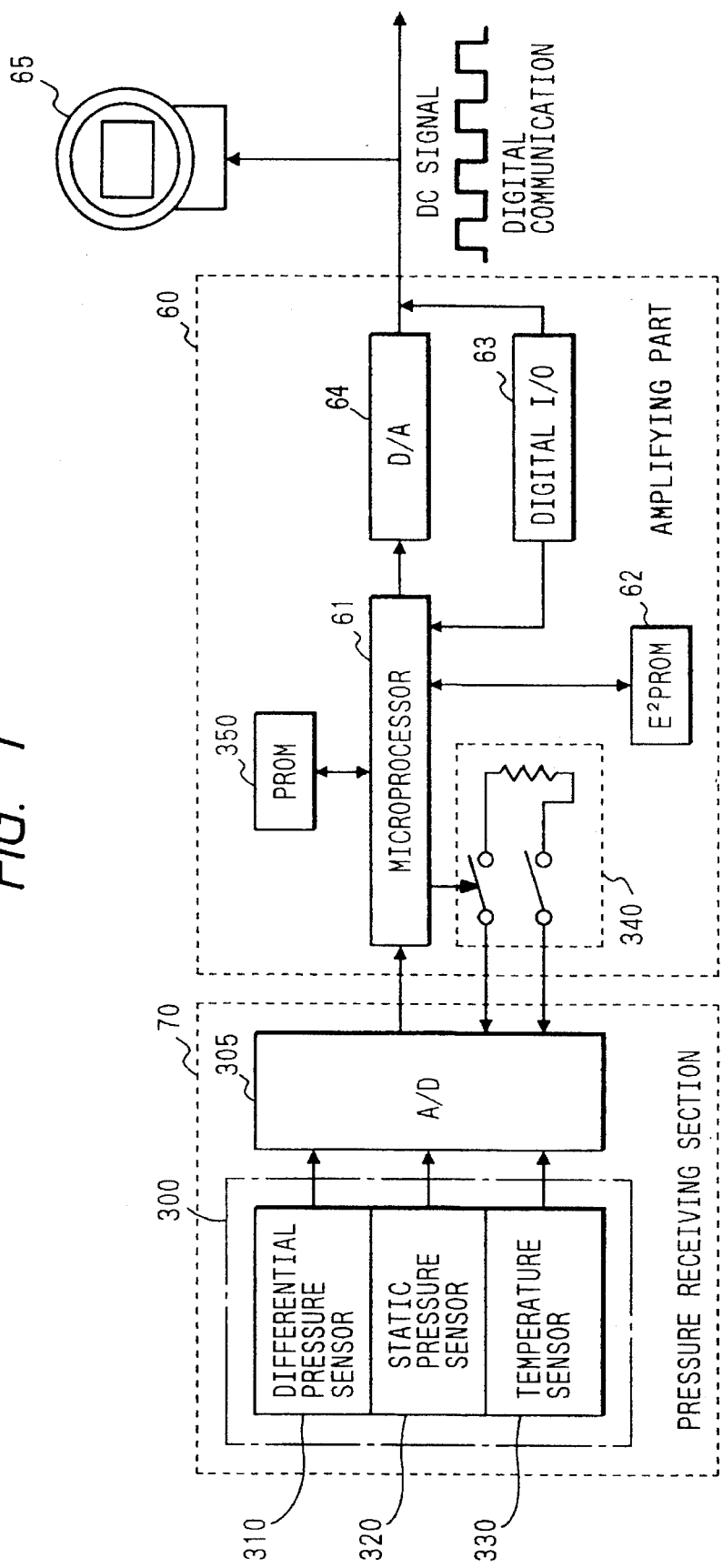
FIG. 1 shows a block diagram of the process condition detecting apparatus of an embodiment of the present invention.

An embodiment of the present invention will be described below, referring to the drawings.

FIG. 1 is a block diagram illustrating the process condition detecting apparatus of the present invention. In FIG. 1, the apparatus illustrated is of the type that provides for example a semiconductor sensor for sensing a differential pressure of a process. The semiconductor sensor senses the differential pressure of the process using first and second resistors. The apparatus of the present invention may be applied to other sensors for sensing other kinds of process conditions such as fluid flow, etc. However, the following description will be with respect to sensing of the differential pressure.

Pressure receiving section 70 senses the pressure of a process, converts values of the pressure to electric signals and converts the electric signals to digital signals. Section 70 is also referred to as a sensing body of the overall detecting circuit. The differential pressure of process fluid is transmitted to a multifunction semiconductor sensor 300, the resistances of first and second resistors of a differential pressure sensor 310 change with the differential pressure, and the change is detected as electric information and fetched by a microprocessor 61 through an A-D conversion circuit 305. A static pressure sensor 320 and temperature sensor 330 are also formed in the multifunction semiconductor sensor 300. Therefore, signals representing the static pressure and temperature are also fetched by the microprocessor 61 through the A-D conversion circuit 305. Data representing the characteristics of each differential pressure sensor with respect to temperature and static pressure is stored in a built-in PROM 350. Therefore, an accurate differential-pressure detecting output superior in temperature and static-pressure characteristics can be obtained by correcting a signal sent from the differential pressure sensor 310 by the microprocessor 61 according to the data stored in PROM 350.

Moreover, the apparatus includes a reference resistor 340 in an amplifying part 60 so that the signal of the reference resistor 340 is input to the A-D conversion circuit 305 according to a signal sent from the microprocessor 61. Thereby, the resistances of the first and second resistors in the differential pressure sensor 310 are obtained. Furthermore, D/A converter 64 converts a digital signal to an analog signal in accordance with a command from microprocessor 61.

Furthermore, the apparatus of the present invention makes it possible to display the information on the process condition obtained from the multifunction sensor 300, by converting the information into a direct current signal (e.g., 4 to 20 mA), sending it to a display unit 65 set in the vicinity of the amplifying part 60, superimposing a digital signal of the information on the direct current signal to send it, and directly sending the signal from the amplifying part 60.

It is possible to display the information on the process condition by the apparatus by superimposing the digital signal on a direct current signal by a digital I/O circuit 63 and by transmitting the composite signal to an external monitoring/controlling unit including the display unit 65, and to set and alter parameters including a measurement range, etc., adjust output, monitor the input and output, and perform self-diagnosis.

Figure 2:
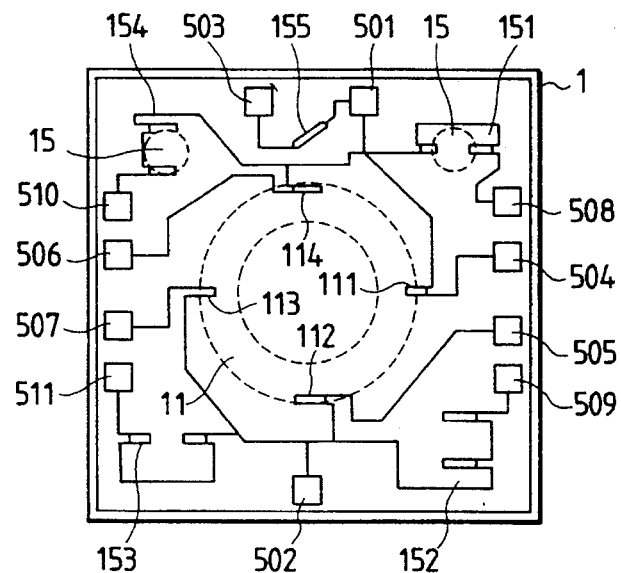
FIG. 2 shows a top view of the multifunction sensor of the embodiment of the present invention.
Figure 3:
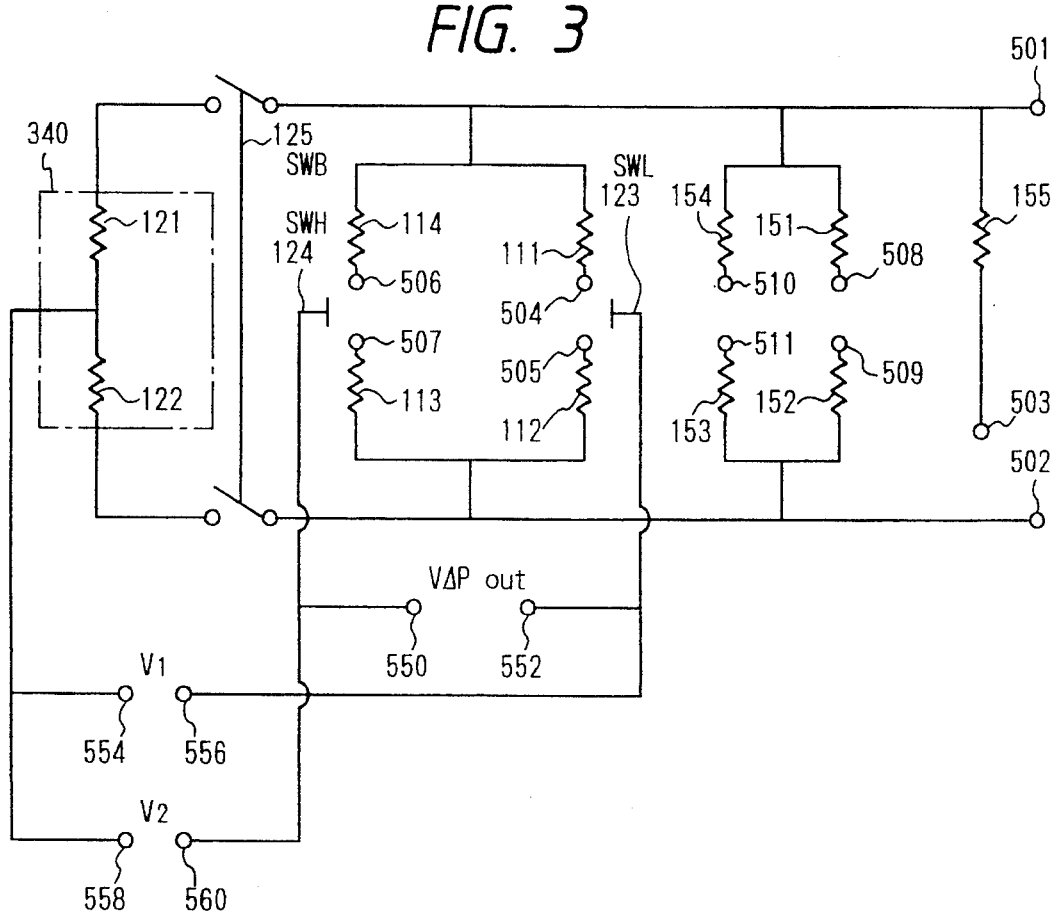
FIG. 3 shows the circuit diagram of the multifunction sensor of the embodiment of the present invention.

FIG. 2 is a top view of the semiconductor substrate of the multifunction semiconductor sensor 300 used for the embodiment of the present invention and FIG. 3 is an example of circuit wiring of sensor resistors provided on the substrate and the reference resistor provided in the amplifying part 60 shown in FIG. 1.

Power supplying terminals 501 and 502 connected with an output temperature signal terminal 503 through a resistor element 155 and resistor elements 111 to 114 supply electric power. A multifunction differential pressure sensor chip 1 is made of n-type single-crystal silicon on the face thereof and has a thin-wall part 11 at the center of one side of the chip 1. By applying a first process pressure and second process pressure to the thin-wall part 11 on the substrate from the sides of the substrate, the thin-wall part 11 serves as a strain generator sensing a differential pressure and operates as a pressure sensitive diaphragm for detecting the differential pressure. P-type resistor elements (gauge resistor) 111 to 114 serving as differential pressure sensors are formed as first and second resistors on the top of the thin-wall part 11 serving as the differential pressure sensitive diaphragm in an axis direction perpendicular to the face of the chip 1, in which the piezoresistance coefficient on the face of the chip 1 is maximized, in parallel with and vertically to the crystal axis respectively through a thermal diffusion method or ion implantation method. The resistor elements 111 to 114 are arranged at places near fixed parts where strains generated in radial and circumferential directions on the thin-wall part 11 serving as the differential pressure sensitive diaphragm is the maximum when a differential pressure is applied. The resistor elements 111 and 113 are arranged in radial directions and the resistor elements 112 and 114 are arranged in circumferential directions, and the end of each resistor element is connected to a detection terminal.

Resistor elements 151 and 154, connected to strain generators 15 and resistor elements 152 and 153, sensing a static pressure are formed at a thick-wall part different from the thin-wall part 11 serving as the differential pressure sensitive diaphragm, and a resistor element 155 sensing temperature is also formed. Output static pressure signals terminals 508 and 511 are connected to the resistor elements 151 and 154. Thus, a differential pressure signal with high accuracy can be obtained by connecting these resistors in a bridge circuit as shown in FIG. 3. The size and wall thickness of the thin-wall part 11 serving as the differential pressure sensitive diaphragm are determined to be desired values according to the differential pressure to be sensed. The thin-wall part 11 is formed by anisotropic wet etching or dry etching.

The resistor elements 111 to 114 on the thin-wall part 11 serving as the differential pressure sensitive diaphragm sense the strain generated on the diaphragm, and their resistances are changed due to the piezoresistance effect. Therefore, it is possible to output the resistance changes from terminals 504 to 507 as signals by using a circuit system shown in FIG. 3.

Figures 4, 5:
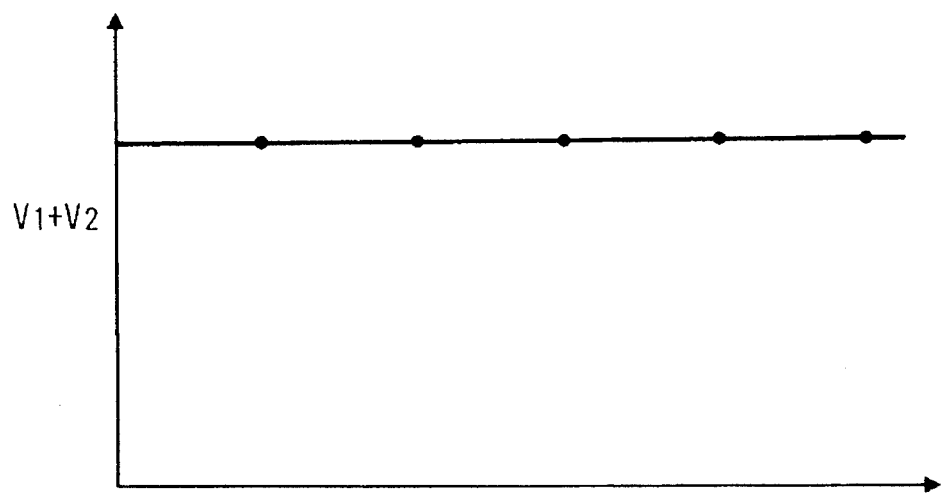
FIG. 4 is a diagram showing the status of the switches for connecting the sensor circuit with the reference resistor of the present invention.
FIG. 5 is an illustration for explaining the output voltage relation between the first and second resistors of the embodiment of the present invention.

FIG. 3 shows an example of a circuit for connecting the resistors and the reference resistor of the differential pressure sensor, and FIG. 4 shows a connection state of switches for connecting first and second resistors and the reference resistor 340, having resistors 121 and 122 as shown in FIG. 3, constituting the differential pressure sensor. The reference resistor 340 is connected in parallel with the differential pressure detecting resistor elements 111 to 114 through a switch SWB 125 as shown in FIG. 3.

The switch mode 1 shown in FIG. 4 shows a normal differential-pressure detecting condition, in which switches SWH 124 and SWL 123 as shown in FIG. 3 are closed, and the change in the resistances of the resistor elements 111 to 114, as shown in FIGS. 2 and 3 caused by the differential pressure are output from terminals 550 and 552, as shown in FIG. 3, as the output voltage $V_{\Delta p}$ of the bridge circuit.

The switch mode 2, as shown in FIG. 4, shows a mode for detecting the resistance state of the resistor elements 113 and 114 serving as the second resistor for detecting the differential pressure in which the switch SWL 123 is opened and, the switch SWH 124 is closed when the switch SWB 125 is closed. Thus, the resistance when the second resistor is connected to the reference resistor is output from the terminals 558 and 560, as shown in FIG. 3, as a voltage $V_2$.

The switch mode 3 shows a mode for obtaining resistance state of the resistor elements 111 and 112 as the first resistor for detecting the differential pressure in which the switch SWL 123 is closed and the switch SWH 124 is opened when the switch SWB 125 is closed. Thus, the resistance when the first resistor is connected to the reference resistor 340 is output from terminals 554 and 556, as shown in FIG. 3 as a voltage $V_1$.

Therefore, it is possible to detect the change of the resistances of the first and second resistors because a common resistor is used as the reference resistor.

FIG. 5 is a graph showing the change of the voltage $V_1+V_2$ of the sum of the voltage $V_1$ representing the resistance of a combination of the first resistor and the reference resistor, and the voltage $V_2$ representing the resistance of a combination of the second resistor and the reference resistor when the environment (static pressure P, differential pressure $\Delta P$, and temperature T) is changed in which the semiconductor sensor 1 is installed when the sensor resistor elements 111 to 114 are normal (where no change with the passage of time occurs) in a process condition detecting apparatus provided with the circuit of the embodiment of the present invention shown in FIG. 3. From FIG. 5, it is found that the value $V_1+V_2$ is almost constant in spite of the change of the environment.

For reasons explaining why the value is constant, as shown in the top view of the semiconductor sensor of FIG. 2, the resistor elements 111, 112 constituting the first resistor and the resistor elements 113, 114 constituting the second resistor are all formed on the same thin-wall part 11 serving as the differential pressure measuring diaphragm. The resistor elements 111, 113 are so arranged on the thin-wall part 11 that they exhibit the same change proportional with the change in differential pressure, static pressure, and temperature. The resistor elements 112, 114 are also arranged in a similar way, and consequently the resistances of the first and second resistors change similarly with the change (differential pressure, static pressure and temperature changes) of the surrounding environment.

Therefore, when the state of the differential pressure applied to the diaphragm changes, the resistances of the resistor elements 111 and 113 increase and those of the resistor elements 112 and 114 decrease, in the bridge circuit shown in FIG. 3. For another change of the state of the differential pressure, the resistances of the resistor elements 111 and 113 decrease and those of the resistor elements 112 and 114 increase. Therefore, when the voltage value $V_1$ representing the increased resistance (or decreased value) of the first resistor is detected, and the voltage $V_2$ representing the decreased resistance (or increased value) of the second resistor is detected by combining the reference resistor 340 with the first resistor, and when the voltage value $V_1+V_2$ is obtained from the above values, the increased values (or decreased values) of the resistances mutually offset each other and the voltage value $V_1+V_2$ is constant.

Therefore, if the first or second resistor changes with the passage of time and with other factors remaining constant, the obtained voltage value $V_1+V_2$ changes. To automatically detect the above time-varying change, the process condition detecting apparatus of the embodiment of the present invention makes it possible to detect a change of the semiconductor sensor 1 with the passage of time by previously measuring the reference value of the voltage $V_1+V_2$ under a condition where no change with the passage of time occurs and storing it in the PROM 350, or designating the value to the microprocessor 61, and making the microprocessor 61 judge how the voltage value $V_1+V_2$ changes from the reference value at predetermined time intervals or under any condition.

Figure 6:
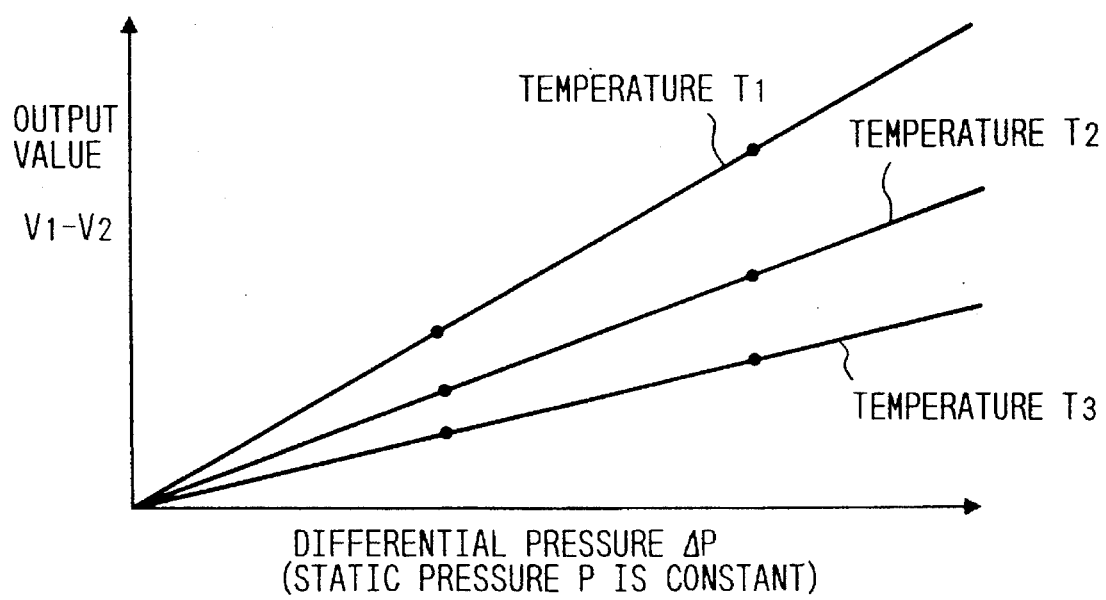
FIG. 6 is an illustration for explaining the output voltage relation between the first and second resistors of the embodiment of the present invention.

FIG. 6 is a graph showing the change of the voltage $V_1+V_2$ of the difference of the voltage $V_1$ representing the resistance of a combination of the first resistor and the reference resistor, and the voltage $V_2$ representing the resistance of a combination of the second resistor and the reference resistor when keeping the static pressure constant and changing the differential pressure and temperature of the environment where the semiconductor sensor 1 is placed, and when the sensor resistors 111 to 114 are normal (where no change with the passage of time occurs), in a process condition detecting apparatus provided with the circuit of the embodiment of the present invention shown in FIG. 3. From FIG. 6, it is found that the value $V_1-V_2$ greatly depends on the temperature and the differential pressure.

The output value is the voltage value $V_1-V_2$, as shown in FIG. 6, is output unless the resistances of the first and second resistors change with the passage of time. But when the voltage value changes with the passage of time, voltage value $V_1-V_2$ does not equal the output value shown in FIG. 6.

Therefore, it is possible to detect that a change with the passage of time occurs in the semiconductor sensor 1 by previously measuring the reference value of the voltage $V_1-V_2$ (hereinafter referred to as a data map) when the differential pressure, static pressure, and temperature change respectively under a condition where no change with the passage of time occurs and storing it in the PROM 350, and making the microprocessor 61 judge how the voltage $V_1-V_2$ changes from the reference value of the data map under the condition of differential pressure, static pressure, and temperature at predetermined time intervals or under any condition.

Figure 7:
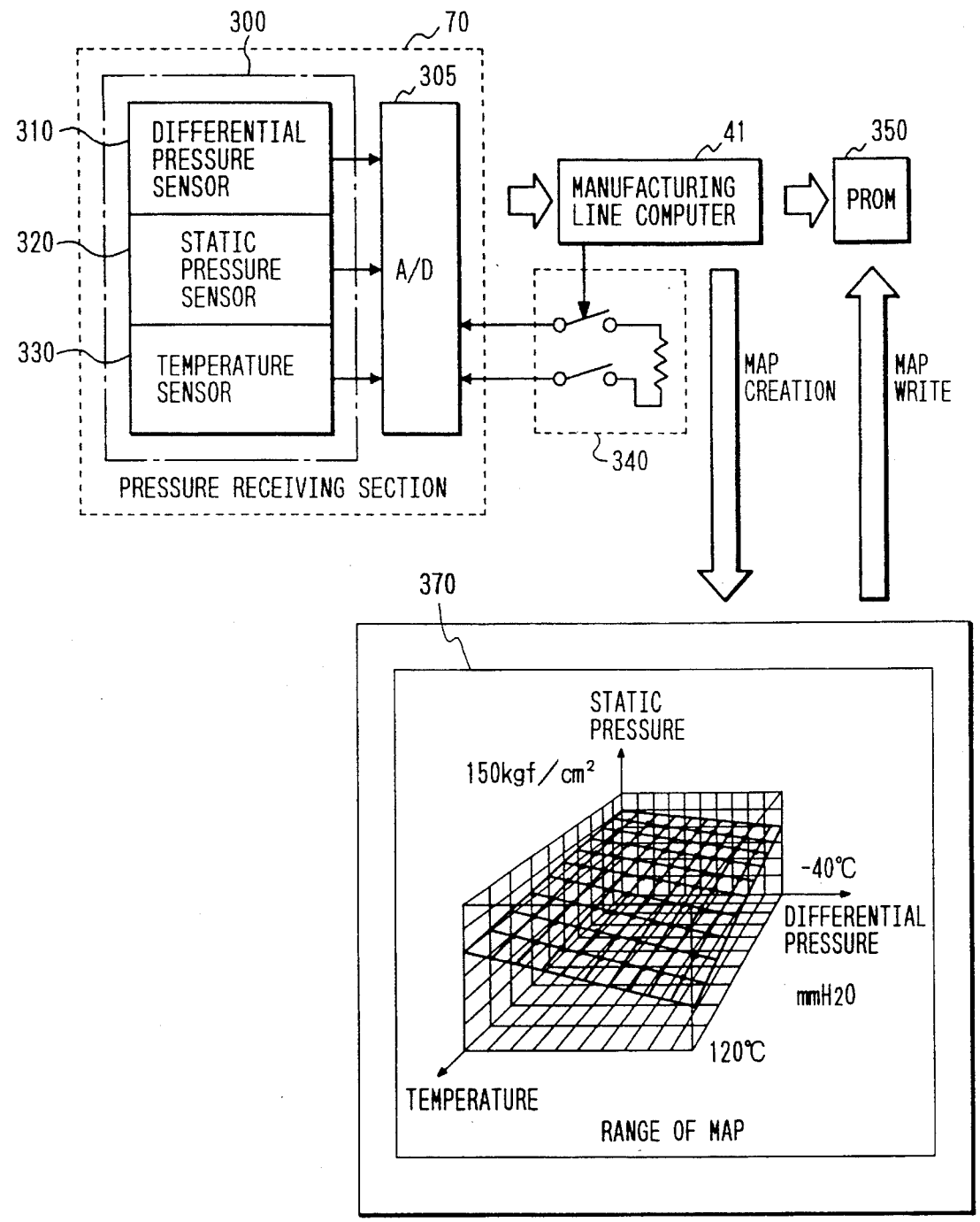
FIG. 7 shows how to create a data map of the embodiment of the present invention.

FIG. 7, in the process condition detecting apparatus of the present embodiment of the invention, shows how to generate the reference data (hereinafter referred to as data map) including the voltage $V_1-V_2$ which is the difference of the voltage $V_1$ representing the resistance of the first resistor and the voltage $V_2$ representing the resistance of the second resistor which are obtained from the differential pressure sensor 310 provided on the multifunction semiconductor sensor 300.

Before the multifunction semiconductor sensor 300 including the differential pressure sensor 310, static pressure sensor 320, and temperature sensor 330 is used in the field, the voltage $V_1$ representing the resistance of the first resistor is measured through the A-D converter 305 and the voltage $V_2$ is measured from the second resistor, in a state that the sensor is placed in an environment in which the temperature, static pressure and differential pressure can be adequately changed, while the temperature is changed from −40° to +120° C., the static pressure is changed from 0 to 150 kg/cm² and the differential pressure is changed in range of ±100,000 mmH₂O and the information on the output voltage $V\Delta p_{out}$ and the voltage $V_1-V_2$ is stored in a manufacturing line computer 41.

The manufacturing line computer 41 generates a data map 370 from the stored information according to the output data of the first differential pressure sensor 310 to write the data map 370 in the PROM 350.

In the data map 370 stored in the PROM 350, as shown in FIG. 7, the output voltage $V\Delta P_{out}$ and the voltage $V_1-V_2$ which are corrected for each of values of the differential pressure, temperature and static pressure under the environment in which the sensor 310 is placed.

Figure 8:
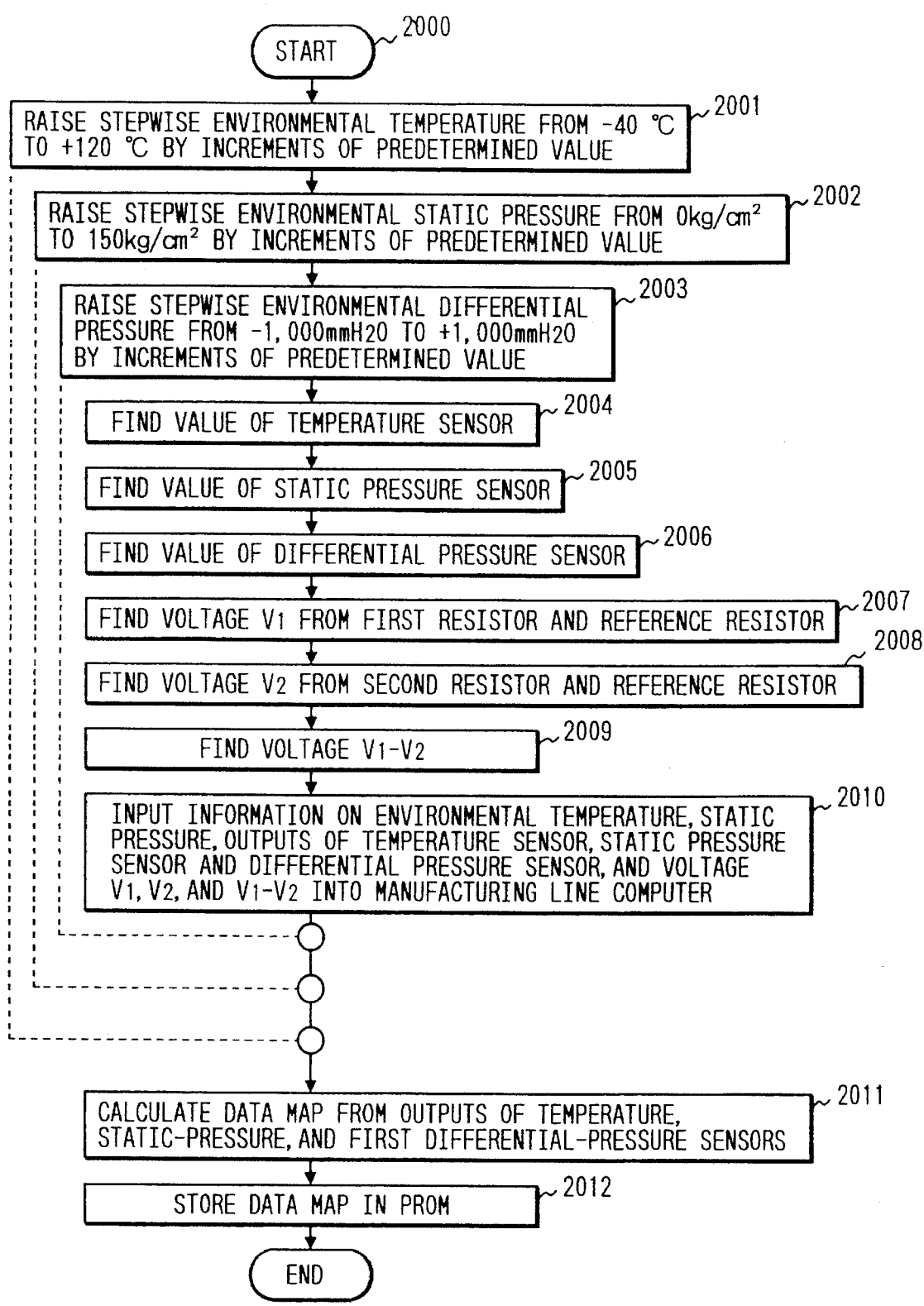
FIG. 8 is a flow chart of a data map creating procedure of the present invention.

FIG. 8 shows a flow chart of the detailed procedure of generating the data map in FIG. 7.

The multifunction semiconductor sensor 300 is placed in an environment in which temperature, static pressure and differential pressure can be changed (Step 2000).

The environmental temperature is raised stepwise from −40° to +120° C. by increments of a predetermined value (Step 2001).

The environmental static pressure is raised stepwise from 0 to 150 kg/cm² by increments of a predetermined value (Step 2002).

The environmental differential pressure is raised stepwise from −1,000 to +1,000 mmH₂O by increments of a predetermined value (Step 2003).

The output of the temperature sensor is detected (Step 2004).

The output of the static pressure sensor is detected (Step 2005).

The output of the differential pressure sensor is detected (Step 2006).

The voltage $V_1$ representing the resistance of the first resistor is detected (Step 2007).

The voltage $V_2$ representing the resistance of the combination of the second resistor and reference resistor is detected (Step 2008).

The voltage $V_1-V_2$ is obtained (Step 2009).

The information on the environmental temperature, static pressure and differential pressure and the output values of the temperature sensor, static pressure sensor and differential pressure sensor and voltages $V\Delta p_{out}$, $V_1$, $V_2$ and $V_1-V_2$ are input to the manufacturing line computer (Step 2010).

A data map is calculated from the outputs of the temperature sensor, static pressure sensor and differential pressure sensor (Step 2011).

The data map is stored in a PROM (Step 2012).

By generating the above-described data maps, it is possible to accurately detect a change with the passage of time of the differential pressure sensor 310 even while the process condition is detected when the maps are actually used in the field.

Moreover, when the resistances of the first and second resistors of a sensor approximately equally change under a process condition as shown in FIG. 5, the voltage $V_1+V_2$ is kept constant against an environmental change. However, when the resistances of the first and second resistors change differentially under a process condition, for example, when the resistors are not disposed at places on the diaphragm where they will exhibit the same change, the voltage $V_1+V_2$ changes with the change of the differential pressure, static pressure and temperature. Even in this case, it is possible to detect a change with the passage of time by using the data map as the reference values even if the voltage $V_1+V_2$, which varies depending on an environmental change, is used.

In the process condition detecting apparatus of the embodiment of the present invention, the voltage $V_1$ obtained from the first resistor of the differential pressure sensor 310 and the voltage $V_2$ obtained from the second resistor of the sensor 310 are determined and the voltages $V_1+V_2$ and $V_1-V_2$ are stored in the E²PROM 62 of a storage unit periodically. The output data condition of the E²PROM 62 will be described below, referring to FIG. 9.

Figure 9:
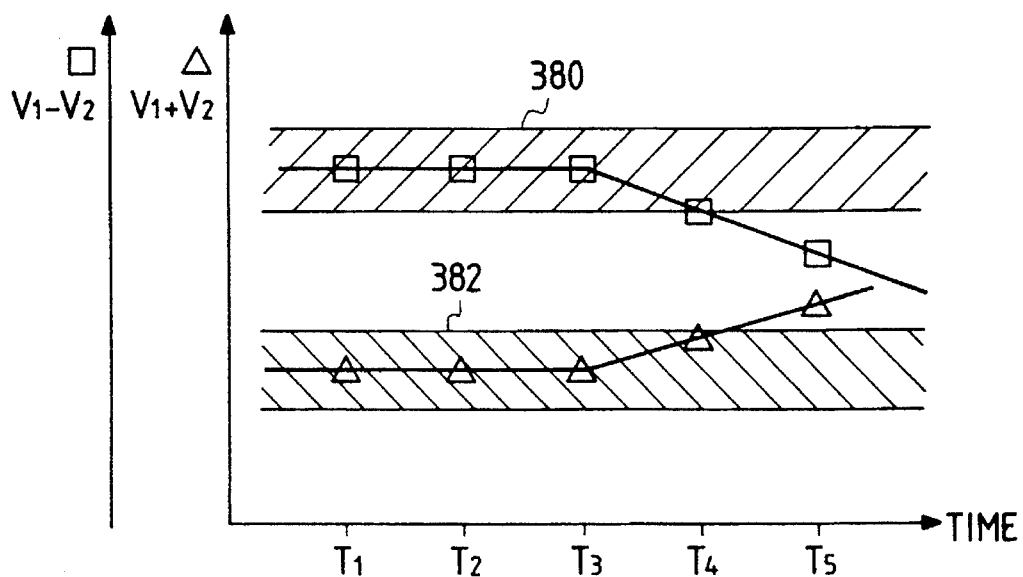
FIG. 9 is an illustration for explaining a change of a sensor with the passage of time.

The differences between the voltages $V_1-V_2$ obtained from the voltage $V_1$ obtained from the resistance of the first resistor of the differential pressure sensor 310 and the voltage $V_2$ obtained from the resistance of the second resistor of the sensor 310 by the process condition detecting apparatus of the present invention and their reference values are stored in the E²PROM 62 in time series. In FIG. 9, a trend is shown that both the voltages $V_1+V_2$ and $V_1-V_2$ change at the time $T_3$, and the change increases at the time $T_4$. Therefore, it can be assumed that a change with the passage of time occurs in the multifunction voltage sensor 300 due to some factor, and it is shown that the process condition detecting apparatus requires maintenance. To judge whether a change with the passage of time occurs, the microprocessor 61 judges whether the voltages $V_1+V_2$ and $V_1-V_2$ for each time exceed their allowable ranges by causing the microprocessor 61 to judge the change of the voltage $V_1+V_2$ and the change of the difference between the voltage $V_1-V_2$ and its reference value, and by setting the allowable range 380 of the change of the voltage $V_1-V_2$ or the allowable range 382 of the difference between the voltage $V_1+V_2$ and its reference value in the microprocessor 61.

This embodiment is an example in which each output data is stored in the memory. However, it is possible to display the output data on the display unit 65. Moreover, it is possible to convert the output data into a digital signal by using the digital I/O 63 and superimpose the digital signal on a direct current signal or output the digital signal to an external unit. Furthermore, it is possible for the external unit to judge whether a change with the passage of time occurs in the multifunction differential pressure sensor 300 based on the data.

It is also possible to send a condition signal representing whether a change with the passage of time occurs in the multifunction-type differential pressure sensor instead of each output data.

Figure 10:
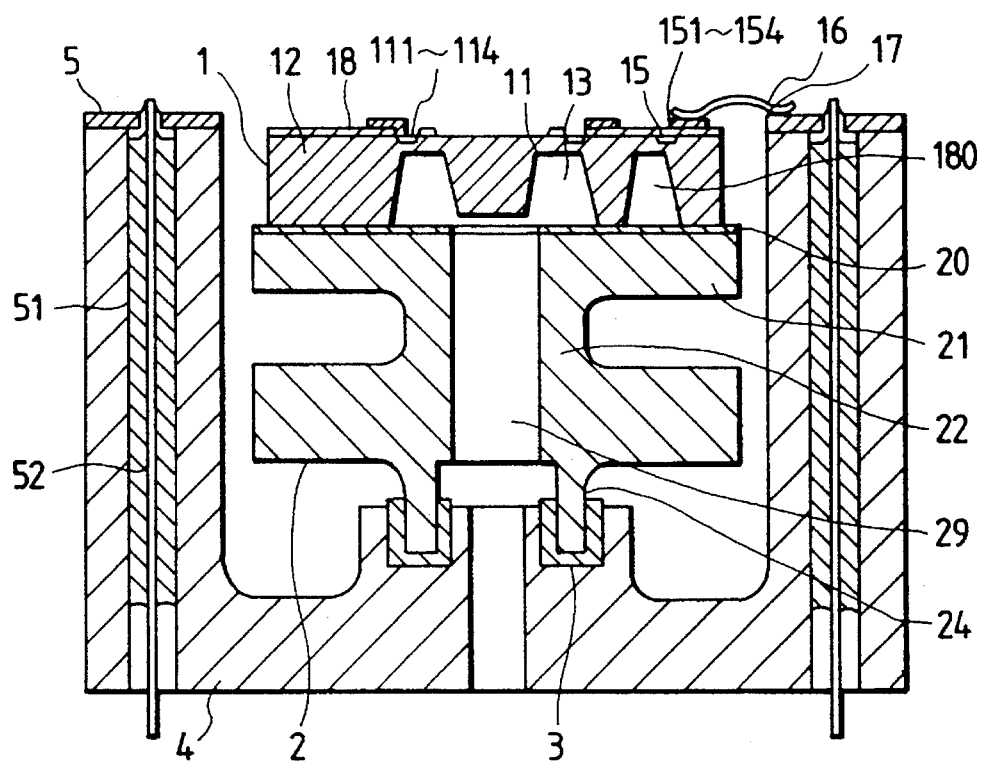
FIG. 10 illustrates the mounting of the multifunction sensor of the embodiment of the present invention.

FIG. 10 shows an example of a support on which the multifunction sensor used in the process condition detecting apparatus of the present invention is mounted.

A multifunction differential pressure sensor chip 1 is attached to a housing 4 through a hollow fixing base 2 and an amount 3. It is desirable to use ceramic (e.g., SiC) whose linear expansion coefficient is close to that of the previously-described silicon in consideration of the electrical insulation of the multifunction-type differential pressure sensor chip 1 from the housing 4 and the decrease of thermal strain due to the difference of linear expansion coefficient between the fixing base 2 and the housing 4. However, if such ceramic is not available, it is permissible to ignore the difference of linear expansion coefficient between them when the material of the base 2 is selected. A bonding layer 20 is provided between the bonding surface of the fixing base 2 and the surface the sensor chip 1 being bonded. The bonding layer 20 can be formed by grazing the bonding surface of the fixing base 2 with oxide solder such as low-melting-point glass, by metal-soldering, or by forming an Au—Si alloy layer, or Au thin film through sputtering or vacuum depositing. Also, the bonding layer 20 can be formed by using an organic or inorganic binder. Thus by forming the bonding layer 20 on the bonding surface of the sensor chip 1 of the fixing base 2, the sensor chip 1 can be easily bonded at a low temperature. Moreover, because the bonding layer is thin, the influence of bonding strain can be greatly decreased.

Signals of the differential pressure, static pressure and temperature sent from the multifunction differential pressure sensor 1 are output from a terminal 52 in a hermetic seal part 51 formed on the housing 4 through a lead wire 16 connecting a terminal 17 and the resistor elements 151 to 154 shown in FIG. 2 and a wiring board 5.

The resistor elements 111 to 114 on the thin-wall part 11 serving as the differential pressure sensitive diaphragm suffer strain generated due to the differential pressure between the top and the recess 13 of the diaphragm and thereby, their resistances change due to the piezoresistance effect. Therefore, the signals can be output from the terminals 504 to 507 by using the circuit system shown in FIGS. 2 and 3. However, these resistor elements 111 to 114 also sense even when the pressure applied to both sides of the thin-wall part 11 serving as the differential pressure sensitive diaphragm is equal (static pressure condition) or the temperature changes, and consequently the output changes. The output change in the former case is called a zero-point change due to static pressure and the output change in the latter case is called a zero-point change due to temperature change. The zero-point change due to temperature change is mainly caused by the variation of resistances of the resistor elements 111 to 114 and by the fact that the resistances of the resistor elements are functions of temperature. Therefore, because the output of the temperature sensor is definitely related to that of the differential pressure sensor, the zero-point change can be easily compensated. The zero-point change due to application of static pressure is mainly caused by strain generated in application of static pressure by components such as the fixing base 2 and housing 4 other than the sensor chip 1. This zero-point change, similarly to the zero-point change due to temperature change, can also be compensated by using the previously-collected information on the relationship between the zero-point change of the differential pressure sensor and the output of the static pressure sensor in application of static pressure.

Moreover, in application of static pressure, the differential pressure sensitivity changes in addition to the zero-point change previously mentioned. This change is called span change. As causes of span change, the following are considered. That is, the sensor chip 1, as shown in FIG. 2, having a thick-wall part 12, is secured to the fixing base 2 or the like through the thick-wall part 12 and mounted on the housing 4 as shown. In this case, strain occurs in the thick-wall part 12 due to the difference between the outside and inside diameters of the thick-wall part 12 during the application of static pressure. The strain is transmitted to the thin-wall part 11 serving as the differential sensitive diaphragm, changing the resistances of the differential pressure resistor elements 111 to 114. Moreover, the strain reaches as much as 5 to 50% of the maximum strain generated in thin-wall part 11 serving as the pressure sensitive diaphragm during measurement of the differential pressure. If a differential pressure is generated on both sides of the thin-wall part 11 under such a high-strain condition, the differential pressure sensitive diaphragm provided by the thin-wall part 11 senses the differential pressure and deforms, and thereby large resistance changes occur in the differential pressure resistors 111 to 114. Because the above-mentioned uniform large static pressure strain is added in the above deformation process, the strain distribution of the differential pressure sensitive diaphragm is different from the strain distribution under the atmospheric pressure (static pressure=0). That is, the output of the differential pressure sensor under the atmospheric pressure is different from that of the differential pressure sensor under a static pressure. It is considered that this output change (span change), as previously described, occurs even under the independent state of the sensor chip 1. However, it is deemed that the previously-described zero-point change does not occur because it is a uniform strain distribution. Moreover, it is necessary to always use appendages such as the fixing base 2, etc. when the sensor chip 1 is mounted as shown in FIG. 2. Therefore, the span change further increases because of the influence of the strain in application of static pressure due to these appendages.

The zero-point change and span change of the differential pressure sensor which is the main strain sensor of the multifunction sensor are serious problems of differential pressure measurement. Particularly the span change is an important problem because the span change most relates to the accuracy of differential pressure measurement and influences the plant control accuracy. Moreover, if the wall thickness of the thin-wall part 11 is decreased to improve the differential pressure sensitivity of the differential pressure sensitive diaphragm provided thereby, the span change increases. Therefore, it is impossible to easily and precisely improve the differential pressure sensitivity.

To solve these problems, a method is generally used to positively compensate the zero-point change and span change of a differential pressure sensor by installing a static pressure sensor for sensing the static pressure on the same chip as an auxiliary sensor and using the signal outputted from the sensor. Particularly, in a multifunction sensor using the difference of Young's modulus with respect to the fixing base 2, an excessive bending strain is generated in the thick-wall part 12 of the sensor in order to obtain a static pressure signal. This bending strain is transmitted to the thin-wall part 11 serving as the differential pressure sensitive diaphragm to greatly interfere with the output of the differential pressure sensor. Therefore, it is necessary to clarify the input-output relation of the differential pressure sensor at each temperature point, each static pressure point, and each differential pressure point in order to obtain a differential pressure sensor with a high accuracy and a small zero-point change. Because the amount of information for determining the input-output relation is very large, a reference data map for input-output characteristics of the differential pressure sensor when the temperature and static pressure are changed is created and stored in the PROM 350 similar to the method for creating the reference data map for occurrence of a change with the passage of time.

Figure 11:
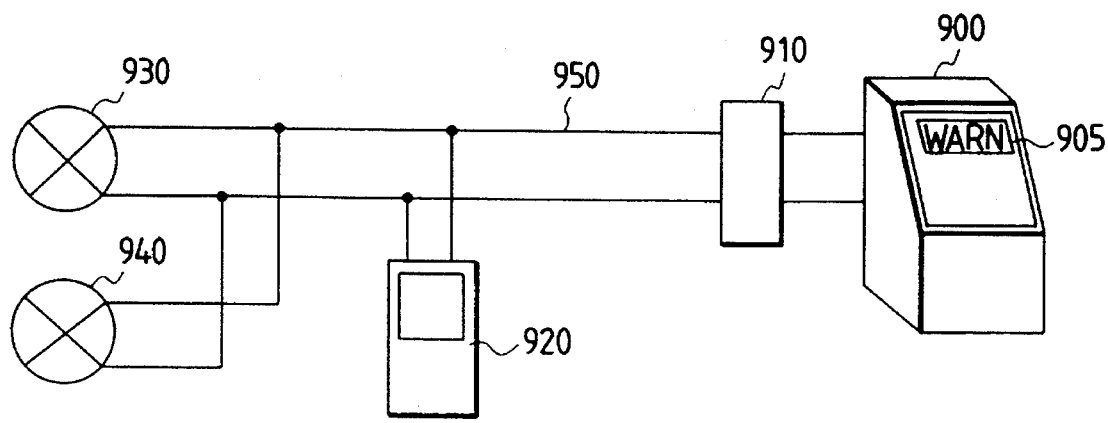
FIG. 11 shows an example of a system constitution using the process condition detecting apparatus of the present invention.

FIG. 11 shows an embodiment of a process control system where a process condition detecting apparatus of the present invention is connected to host equipment for monitoring and controlling the process condition.

An aging change of process condition detectors 930 and 940 connected to a two-wire system transmitter 950 can be detected at a place remote from the process site by connecting the detectors to an operator console 900 through a signal comparator 910. Moreover, the change of the process condition detectors can be detected by a hand-held communication device 920 connected to a two-wire transmission circuit, other than the operator's console 900.

Figure 12:
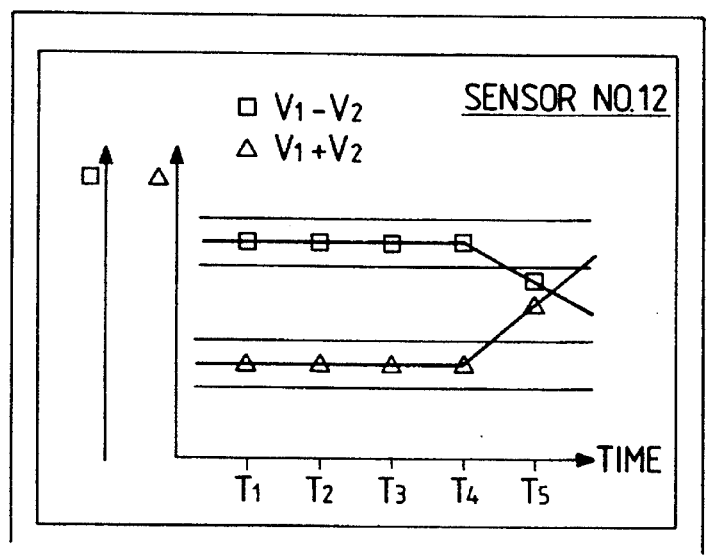
FIG. 12 shows an example of a display of a change of the sensor with the passage of time.
Figures 13, 14:
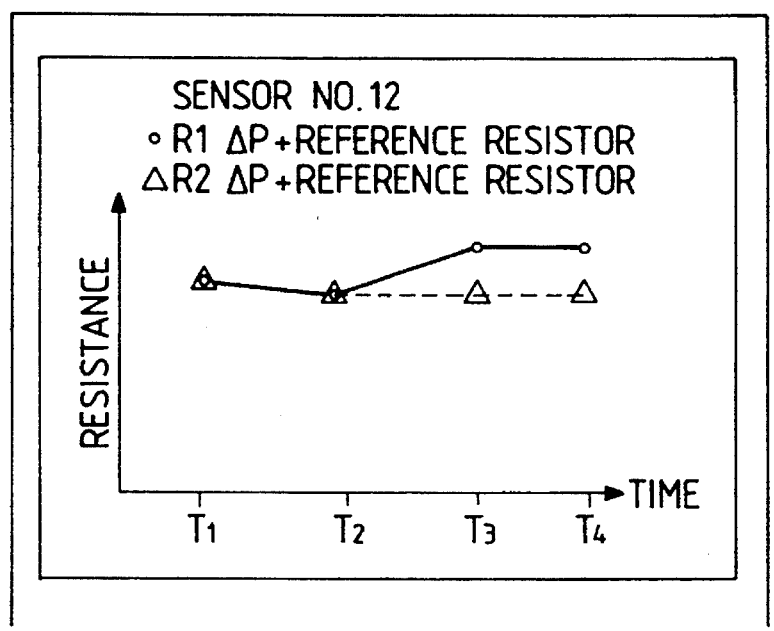
FIG. 13 shows an example of a display of a change of the sensor with the passage of time.
FIG. 14 shows an example of a display for a change of the sensor with the passage of time.

FIGS. 12, 13, and 14 show an embodiment of a process control system of FIG. 10, in which an aging change of the semiconductor sensor of the process condition detector of the present invention is displayed on the operator's console 900.

FIG. 12 is an example of time-series display of data showing a change with the passage of time obtained from a differential pressure sensor having first and second resistances provided on the sensor of the process condition detector. From FIG. 12, it is found that the change of the sensor with the passage of time increases as time passes.

FIG. 13 shows a change of each process condition detecting apparatus with the passage of time when a plurality of process condition detecting apparatuses are provided in a process monitoring system. This example shows a condition in which a change with the passage of time occurs in the process condition detecting apparatus (sensor) No. 11.

FIG. 14 shows a change of the resistances of the first and second resistors, for example, a combination of the resistor elements 111, 112 and elements 113, 114 shown in FIG. 3, constituting a differential pressure sensor circuit provided in a multifunction sensor. If the resistance changes of the first and second resistances are almost the same, a change with the passage of time can be detected by comparing these resistances without measuring the voltages of when the reference resistor is combined with the first and second resistors.

In each of the above examples, the change of the sensor of the process condition detector with the passage of time is displayed on the operator's console 900. The information display unit is not restricted to the operator's console 900. It is possible to use a hand-held type display unit 920, or a display provided in the process condition detector 930 or 940 or it is also possible to display the data to be displayed on these display units by arbitrarily combining the above mentioned methods. As to the timing of displaying a change with the passage of time, it is possible to display a warning 905 on a display as shown in FIG. 11 and to display a change of a sensor as an interruption when programmed control means in the operator's console 900 detects the change with the passage of time while the process condition is monitored. It is also possible to display a change with the passage of time of a sensor of a process condition detecting apparatus specified by the process monitoring personnel. It is further possible to display the change on a display unit whenever a predetermined time passes.

In the embodiment of the present invention, first and second differential pressure sensitive resistors are used to detect an aging change of the differential pressure sensor of the multifunction semiconductor sensor. However, the present invention can also be applied to the detection of a change of a static pressure sensor and temperature sensor.

For example, it is possible to detect whether a change with the passage of time occurs in the static pressure sensor shown in FIG. 3 by providing a first switch for terminals 508 and 509 connected to first resistors of resistor elements 151 and 152 of the static pressure sensor and a second switch for terminals 510 and 511 connected to the second resistor elements 153 and 154, combining these switches and by connecting them to the reference resistor 340.

In the embodiment of the present invention, a bridge circuit whose four arms each comprise a resistor which senses pressure is used. However, a circuit for detecting a change with the passage of time is not restricted to the above circuit. The present invention can be also embodied by using a bridge circuit of which two of the four arms comprise a resistor which senses pressure and of which the other two arms use a dummy resistor, or a bridge circuit of which one of the four arms comprises a resistor which senses pressure and the other three arms use a dummy resistor, and by using detection terminals and switches so that each resistor change can be obtained.

In the process condition detecting apparatus of the embodiment of the present invention shown in FIG. 1, the reference resistor 340 is provided in the amplifying part of the apparatus so that it will not influenced by a process condition change. However, the location of the reference resistor is not restricted to the amplifying part. For example, it is possible to insert the resistor in a pressure receiving part as shown in FIG. 15 or it is possible to provide the reference resistor detachably in the apparatus as long as the resistance of the reference resistor is initially selected to be equal to those of the first and second resistors of the sensor if the reference resistor will not be influenced by a process condition change.

As mentioned above, the present invention makes it possible to detect a change of a multifunction sensor used in a process condition detecting apparatus with the passage of time. Therefore, the present invention has advantages that the service life of the sensor can be predicted and the number of steps for maintenance and control for detection of a process condition can be greatly decreased Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A process condition detecting apparatus provided with a semiconductor sensor having first and second resistors that are parallel and perpendicular, respectively, to a crystal axis of a single-crystal silicon chip, wherein the resistances of said first and second resistors change according to a change in a condition of a process, said semiconductor sensor sensing the condition of the process by detecting the change in the resistances of said first and second resistors, said apparatus comprising:

a reference resistor having a constant reference value;

a comparator apparatus for comparing said reference resistor to the resistances of said first and second resistors respectively and outputting a first resistance comparison value and a second resistance comparison value, respectively;

switching means for switching and connecting pairs from among said first, second and reference resistors;

a detector for detecting a resistance value based upon a comparison between said first resistance comparison value and said second resistance comparison value, and outputting the detected resistance value; and a sensor condition detecting apparatus for detecting a change in accuracy of the sensing performed by the semiconductor sensor based on said first and second resistance comparison values output by the comparator apparatus and the detected resistance value output by said detector.

2. A process condition detecting apparatus according to claim 1, wherein the first and second resistors sense a pressure difference produced in the process.

3. A process condition detecting apparatus according to claim 1, wherein the first and second resistors sense a pressure produced in the process.

4. A process condition detecting apparatus according to claim 1, wherein the first and second resistors sense a temperature of the process.

5. A process condition detecting apparatus according to claim 1, wherein the detected resistance value is detected by said detector at predetermined time intervals.

6. A process condition detecting apparatus according to claim 1, wherein the detected resistance value is detected by said detector at arbitrary time intervals.

7. A process condition detecting apparatus according to claim 1, wherein said sensor condition detecting apparatus includes storage means for storing the comparison values output by the comparator apparatus.

8. A process condition detecting apparatus according to claim 1, wherein said sensor condition detecting apparatus generates a signal when a comparison value output by the comparator exceeds a predetermined reference value.

9. A process condition detecting apparatus according to claim 1, further comprising:

storage means for storing comparison reference values obtained by the comparator apparatus under a reference condition of said semiconductor sensor.

10. A process condition detecting apparatus according to claim 1, wherein said sensor condition detecting apparatus outputs a signal when a comparison value output by said comparator apparatus increases as time passes.

11. A process condition detecting apparatus according to claim 1, further comprising:

a reference resistor for use in detecting the resistance of either of said first and second resistors.

12. A process condition detecting apparatus according to claim 1 further comprising:

a reference resistor arranged in parallel with either of said first and second resistors.

13. A process condition detecting apparatus according to claim 12, wherein said first and second resistors are provided by a bridge circuit.

14. A process condition detecting apparatus according to claim 12, wherein said first and second resistors are arranged in series.

15. A process condition detecting apparatus according to claim 13, further comprising:

a resistor for compensating for inaccuracies in the sensing performed by said semiconductor sensor, said resistor being provided by said bridge circuit.

16. A process condition detecting apparatus according to claim 12, wherein said first and second resistors are arranged in parallel.

17. A process condition detecting apparatus according to claim 16, wherein:

said first resistor comprises first and second resistor elements;

said second resistor comprises third and fourth resistor elements; and a bridge circuit includes the first, second, third and fourth resistor elements.

18. A semiconductor sensor condition detecting circuit for a semiconductor sensor having first and second resistors that are parallel and perpendicular, respectively, to a crystal axis of a single-crystal silicon, the resistances of said first and second resistors change according to a change in a condition of a process, said semiconductor sensor sensing the condition of the process by detecting the change in resistances of said first and second resistors, said apparatus comprising:

a reference resistor having a constant reference value;

means for periodically comparing the resistance of said reference resistor to the resistance of either of said first and second resistors and outputting resulting comparison values; and means for detecting a change in condition of said semiconductor sensor based on the resulting comparison values.

19. A semiconductor sensor condition detecting circuit according to claim 18, wherein said reference resistor is arranged in parallel with either of said first and second resistors.

20. A semiconductor sensor condition detecting circuit according to claim 18, wherein said first and second resistors are provided by a bridge circuit.

21. A semiconductor sensor condition detecting circuit according to claim 18, wherein said first and reference resistors, or said second and references resistors are provided by a bridge circuit.

* * * * *